United States Patent [19]
Ohashi et al.

[11] Patent Number: 4,685,547
[45] Date of Patent: Aug. 11, 1987

[54] WHEEL SLIP CONTROLLING SYSTEM

[75] Inventors: Kaoru Ohashi; Ikuya Kobayashi, both of Okazaki; Takahiro Nogami, Toyota; Akira Shirai, Toyoake; Kazumasa Nakamura, Okazaki; Yoshihisa Nomura, Toyota, all of Japan

[73] Assignee: Toyota Jidosha Kabushiki Kaisha, Toyota, Japan

[21] Appl. No.: 790,452

[22] Filed: Oct. 23, 1985

[30] Foreign Application Priority Data

Oct. 30, 1984 [JP] Japan .................. 59-228538

[51] Int. Cl.⁴ .................. B60K 41/20
[52] U.S. Cl. .................. 192/3 R; 180/197
[58] Field of Search .......... 192/1, 3 R; 180/197; 364/426; 303/97, 99

[56] References Cited

U.S. PATENT DOCUMENTS

| 1,741,818 | 12/1929 | Bragg et al. | 192/3 R |
| 2,170,766 | 8/1939 | Rieger | 180/197 X |
| 3,802,528 | 4/1974 | Leiber | 180/197 X |
| 3,912,034 | 10/1975 | Pallof | 192/3 R X |
| 3,938,611 | 2/1976 | Bertolasi | 180/197 |
| 4,416,347 | 11/1983 | Bertling et al. | 180/197 |
| 4,432,430 | 2/1984 | Lind et al. | 180/197 |

FOREIGN PATENT DOCUMENTS

| 2241666 | 3/1973 | Fed. Rep. of Germany | 180/197 |
| 2832739 | 2/1980 | Fed. Rep. of Germany | 180/197 |
| 2962 | 1/1984 | Japan . | |

Primary Examiner—Rodney H. Bonck
Attorney, Agent, or Firm—Cushman, Darby & Cushman

[57] ABSTRACT

A wheel slip controlling system is provided to immediately control the rotation of the drive wheels by controlling the output power of an internal combustion engine as well as by controlling the brake mechanism of the drive wheels when a slippage is detected during the process of braking or acceleration. The brake mechanism is an anti-skid control system which uses a pressure change-over valve to accurately control the braking force. The wheel slip controlling system also includes a second throttle valve responsive to a traction control mechanism for controlling the amount of intake air of the internal combustion engine such that the speed of the driven wheels can be slowed when slipping occurs.

8 Claims, 5 Drawing Figures

WHEEL SLIP CONTROLLING SYSTEM

BACKGROUND OF THE INVENTION

1. Field of the Invention

This invention relates to a wheel slip controlling system for controlling a frictional force between a tire of a driven wheel and the road surface not only during braking but also during acceleration of a car, and more particularly to a wheel slip controlling system for controlling rotation of a driven wheel by a brake mechanism as well as for controlling the output power of an internal combustion engine.

2. Prior Art

A prior art traction controlling system controls rotation of a wheel during acceleration of a car to provide a maximum frictional force between a tire of a wheel and the road surface so as to improve the stability and acceleration. In this kind of traction controlling system, slipping of a driven wheel is detected and the power of the internal combustion engine is controlled by controlling the ignition timing or fuel injection amount so as to control the rotation of the driven wheel when the degree of slipping is above a predetermined value. However, there are problems with the wheel slip controlling system mentioned above, and this system is regarded as insufficient.

Namely, the conventional wheel slip controlling systems aim at the prevention of slip during acceleration by reducing the fuel injection amount or setting a time lag against a change in the ignition timing so as to control the output of the internal combustion engine. In this case, however, the control capacity is limited, preventive measures against abnormal vibration may have to be taken, or the engine may stop due to abrupt changes in its operating conditions. When the intake air amount is controlled, on the other hand, the ignition timing and the fuel injection amount, etc. are decided in accordance with it. Therefore, the output power of the internal combustion engine can be controlled smoothly to improve the vehicle's drivability. However, if the position of the throttle valve interlocked to the accelerator pedal is controlled by a pedal depressed by the driver, some problems may occur such as kickback to the driver or instability in case of failure of control parts of the throttle valve.

Another problem is that the rotation of driven wheels cannot be controlled immediately due to slow responsiveness of the vehicle when the output power of the internal combustion engine is used for controlling the rotation of the driven wheels. Accordingly, it is desirable to control the rotation of driven wheels directly by using the brake system mounted on the car when the slip of driven wheels occurs during acceleration, but a special brake system will be required to control instantaneously the rotation of driven wheels by using the brake system only. Namely, if the driving force is rather great such as, for example, when the gear position of the transmission is set at the first speed, a special brake system which produces greater braking force will be necessary to give the corresponding braking force against the driving force. The conventional brake system may not work well enough. Also, a pressure source will be required for the purpose of increasing hydraulic pressure supplied to a braking cylinder equipped for the driven wheels of the control system for the car. Therefore, other devices such as an oil pump, etc. must be added to the conventional car for this purpose.

SUMMARY OF THE INVENTION

The first objective of the present invention is to solve the above-mentioned problems and to offer a wheel slip controlling system capable of carrying out fine control without any decrease in drivability and safety of the vehicle or delay in control when a slip of driven wheels occurs during acceleration.

The second objective of the present invention is to offer a wheel slip controlling system wherein the slip of driven wheels during acceleration can be controlled by a brake system with quick response and by a second throttle valve which controls the intake air amount for a longer period.

The third objective of the present invention is to offer a wheel slip controlling system wherein the braking force necessary for the brake mechanism is reduced by employing two means for controlling the rotation of driven wheels which are capable of not only reducing the system in size and weight but achieving a savings in fuel consumption.

The fourth objective of the present invention is to offer a wheel slip controlling system whose constitution is superior in various points over the prior art, e.g., capability of conducting a fine control of the braking force with a simplified structure by utilizing an anti-skid control system for the brake mechanism, etc.

The fifth objective of the present invention is to offer a wheel slip controlling system to avoid vehicle instability by adjusting the intake air amount with a first throttle valve operated during a driver's acceleration, and even if the throttle valve drive device is out of order, the output power of the internal combustion engine is reduced by a second throttle valve.

In order to achieve the above objectives, the wheel slip controlling system of the present invention includes, as shown in FIG. 1, (a) braking means M2 operable by a driver of a car for stopping rotation of driven wheels M1;

(b) slip detecting means M3 for detecting a slipping condition of wheels at least including driven wheels to output a slip signal indicative of the slipping condition;

(c) anti-skid controlling means M4 for receiving the slip signal and for controlling the pressure to be imparted from the braking means M2 with a self-contained pressure source to control braking slips of the wheels at least including the driven wheels;

(d) a second throttle valve M7 placed at an intake air path provided with a first throttle valve M6 interlocked to an accelerator pedal M5; and (e) traction controlling means M8 responsive to the slip signal outputted from the slip detecting means M3 during acceleration of the car for controlling the driven wheels M1 with the self-contained pressure source and for controlling the throttle valve M7 during acceleration slips of the driven wheels M1.

The slip detecting means M3 detects the degree of slipping in relation to road surfaces when a driven wheel M1 is in the state of acceleration. Therefore, the difference of rotation states between a non-driven wheel and a driven wheel M1 is detected, or the actual rotation speed of a driven wheel M1 is compared with the theoretical value of rotation state of the driven wheel M1 without excessive slipping.

A rotation controlling means controls the rotation of the driven wheel M1. There are two rotation control means; namely, a second throttle valve M7 which is operated by the traction control means to control the intake air amount in addition to the first throttle valve M6, and a brake mechanism which is provided with anti-skid controlling means M4 to change the braking force supplied to the driven wheel M1 when slip occurs during deceleration. In other words, the output power of the internal combustion engine which operates the driven wheel M1 is decreased by the second throttle valve M7 so as to control the rotation of the driven wheel M1. Also, the control is carried out by applying the braking force against the rotation of the driven wheel M1 with anti-skid controlling means M4.

Traction controlling means M8 operates the rotation controlling means when it judges the state of slipping as beyond the capacity of the driven wheel M1 during acceleration on the basis of the detected results of the slip detecting means M3. So when the traction controlling means M8 decides that an excessive rotation force is given to the driven wheel M1, it operates the second throttle valve M7 to decrease the driving force of the driven wheel M1, and braking mechanism of anti-skid controlling means M4 is activated to give the braking force to the driven wheel M1.

The invention will be described in more detail with reference to the drawings in connection with a preferred embodiment thereof.

DETAILED DESCRIPTION OF THE PREFERRED EMBODIMENTS

Figure 1:
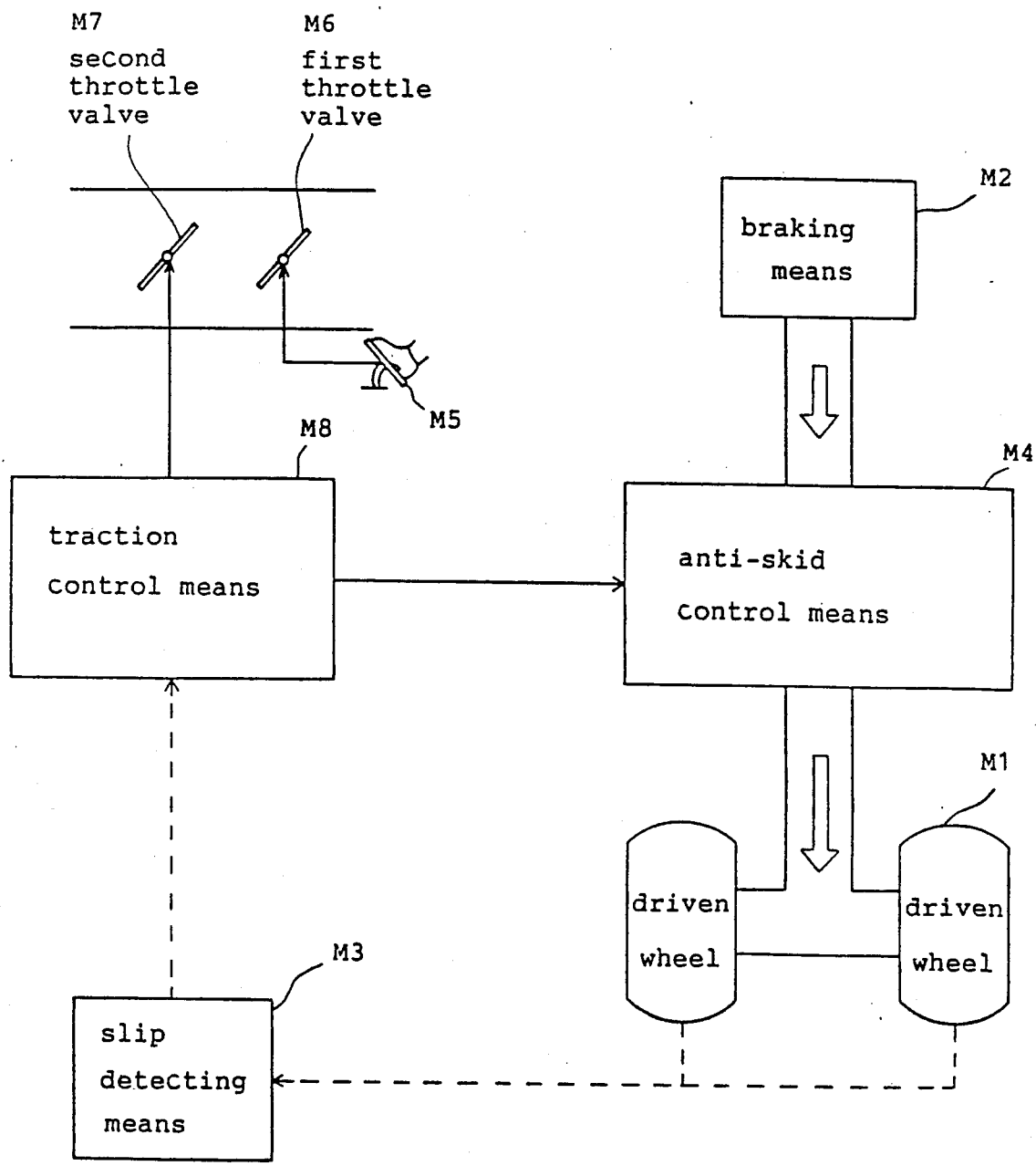
FIG. 1 is a block diagram illustrating a basic construction of the present invention.
Figure 2:
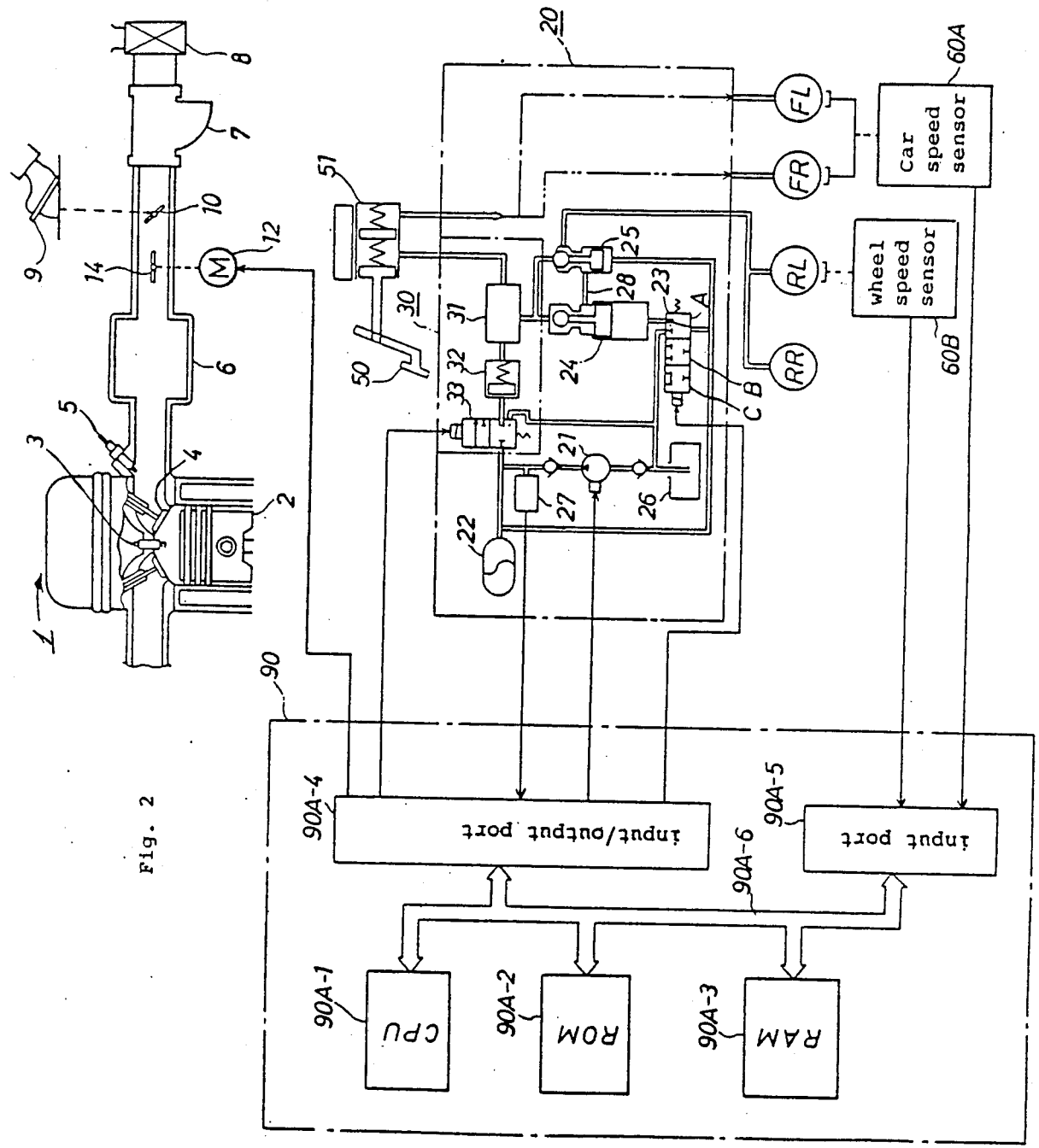
FIG. 2 is a block diagram illustrating the construction of a first embodiment.

FIG. 2 is a schematic diagram of a hydraulic braking system and a controlling system of a wheel slip controlling system according to a first embodiment of the present invention. FIG. 2 shows an engine 1 with a piston 2, a spark plug 3, a suction valve 4, a fuel injector 5, a surge tank 6, an air-flow meter 7, and an air cleaner 8. In addition to a first throttle valve 10, which is prepared conventionally to adjust the intake air amount and is interlocked to an accelerator pedal 9, a second throttle valve 14, which adjusts the intake air amount like the first throttle valve 10 and which is driven by a DC motor 12, is also provided in the intake air path between the air-flow meter 7 and the surge tank 6.

The second throttle valve 14 is in the state of "full open" under normal conditions. The position of valve 14 is adjusted from the "full open" to the "full closed" state so as to control the output power of the internal combustion engine and to carry out slip control only when the traction control is executed as described below.

Referring further to FIG. 2, reference numeral 20 denotes a hydraulic system of a conventional anti-skid brake system, and 30 denotes a hydraulic system for traction control. In particular, if a foot brake 50 is depressed to operate a master cylinder 51 of the tandem type, a braking force is produced at both the left and right front wheels (FL, FR) and left and right rear wheels (RL, RR) corresponding to a hydraulic pressure, and the hydraulic system 20 of an anti-skid brake system for suitably varying the hydraulic pressure of the hydraulic circuit is also provided in the hydraulic circuit. For simplification, FIG. 2 shows only a hydraulic oil path for the rear wheels in detail.

Rotational speeds of the front and rear wheels to which a braking force is applied in such a manner as described above are detected by a car speed sensor 60A and a wheel speed sensor 60B and are transmitted to an electronic controlling device 90. The car speed sensor 60A calculates an average of rotational speeds of the left and right front wheels FL and FR and outputs a signal which is regarded as a travelling speed of the car. Wheel speed sensor 60B outputs a signal indicative of a rotational speed of a driven wheel only.

The hydraulic system 20 of the anti-skid brake system includes a cut valve 24 to which a flow of oil is changed over by means of a three position solenoid valve 23 from a hydraulic source of an accumulator 22 which stores therein oil to be fed under pressure via a hydraulic pump 21, a bypass valve 25 for assuring operation of the braking hydraulic circuit when the hydraulic source gets out of the hydraulic order, a reservoir 26 for temporarily storing excessive oil therein, and a hydraulic switch 27 for detecting the hydraulic pressure of the hydraulic source to provide an output when a predetermined hydraulic pressure is obtained.

FIG. 2 shows the hydraulic system when the anti-skid brake system is not in operation. A piston bypass valve 25 is normally held upward by oil pressure from the accumulator 22. Accumulator 22 is maintained at a high pressure by the pump 21 so that oil from a pressure change-over valve 31, which will be hereinafter described, does not go into the bypass valve 25 and instead flows into the cut valve 24. At this instant, a piston of the cut valve 24 is also held upward since the three position valve 23 is connected at an A port thereof to the cut valve 24. The upward pressure of the accumulator 22 is higher than the pressure of the pressure change-over valve 31. Accordingly, oil which flows into the cut valve 24 from the pressure change-over valve 31 flows out of an upper chamber of the cut valve 24, passing through a bypass path 28 and then into the upper chamber of the bypass valve 25 to provide a braking force to the driven wheels RR and RL.

In other words, the bypass valve 25 only acts as a bypass hydraulic path which imparts a braking force to driven wheels via an upper chamber of the bypass valve 25 when the hydraulic pressure from the accumulator 22 is normal and while the cut valve 24 holds the capacity of the upper chamber thereof to its minimum. This path is unchangeable when the three position valve 23 is connected at the A port thereof to the cut valve 24 because the braking hydraulic pressure can be controlled only by a pressure of the pressure change-over valve 31.

If the anti-skid brake system determines in response to some signal that it is necessary to reduce the hydraulic pressure imparted from the pressure change-over valve 31 to the driven wheels to reduce the braking force thereof, the electronic controlling device 90 actuates the three position valve 23 to connect a C port of the latter to the hydraulic system. Then the pressure in a lower chamber below the piston of the cut valve 24 becomes equal to the low pressure of the reservoir 26, and as a result, the piston is pushed down by the pressure of the pressure change-over valve 31 to increase the volume of oil and to lower the hydraulic pressure in the upper chamber of the cut valve 24 which has provided the braking force to the driven wheels RR and RL. In this manner, the braking force is reduced. Then if a B port of the three position valve 23 is connected to the hydraulic system after the piston of the cut valve 24 has been lowered to a position at which a suitable braking force can be obtained, the piston of the cut valve 24 will stop moving, thereby fixing the pressure in the upper chamber of the cut valve 24 which provides the braking force.

In the meantime, if the hydraulic system 20 of the antiskid brake system malfunctions for any reason so that the pressure of the accumulator 22 becomes low, the piston of the bypass valve 25 will move downward so that a spherical valve at the top of the piston divides the valve body into an upper chamber and a lower chamber. Thus the cut valve 24 is divided into upper and lower chambers as the piston moves down. The pressure of the pressure change-over valve 31 then is introduced directly into the upper chamber of the bypass valve 25 to form a new hydraulic system which provides a braking force to the driven wheels RR and RL to assure that the braking operation is responsive to the driver.

The hydraulic system 30, which is provided for traction control, now will be described. A hydraulic system of a conventional anti-skid brake system is constructed such that pressurized oil from the master cylinder 51 of the foot brake is directly introduced into the cut valve 24 and the bypass valve 25. In the present system, however, a pressure change-over valve 31 is provided in the hydraulic system such that oil pressure may be introduced into the two valves 24 and 25 via the pressure change-over valve 31. The pressure change-over valve 31 is a valve of the 2-input 1-output type which selectively outputs one of two inputs which is higher in pressure than the other. The master cylinder 51 of the foot brake 50 is connected to one of the two inputs of the pressure change-over valve 31 while another cylinder 32 is connected to the other input. The above-described accumulator 22 serves as a power source for operating the cylinder 32, and a two position valve 33 which is controlled by the electronic controlling device 90 switches the connection between the accumulator 22 and the cylinder 32.

The electronic controlling device 90 detects a condition of the braking hydraulic system as described above and produces a controlling output depending upon such detection. In particular, the electronic controlling device 90 receives output signals from the car speed sensor 60A, the wheel speed sensor 60B and the hydraulic switch 27 as detection information of the braking hydraulic system, and outputs signals to control the pump 21, the three position valve 23, the two position valve 33 within the hydraulic system, and the DC motor 12 in accordance with results of such detection. FIG. 2 illustrates a block diagram of the electronic controlling device 90 which is constructed from digital circuits including a microcomputer at the center thereof. Reference symbol 90A-1 denotes a CPU which carries out operation, 90A-2-a ROM which stores a controlling program and various constants therein, 90A-3 a RAM, 90A-4 an input/output port which outputs controlling signals for operating the DC motor 12, several hydraulic valves and the pump 21 in the hydraulic system and which shapes and receives signal from the hydraulic switch 27, 90A-5 an input port which receives a signals from the two speed sensors, and 90A-6 a bus line forming a passage of information.

Figure 3:
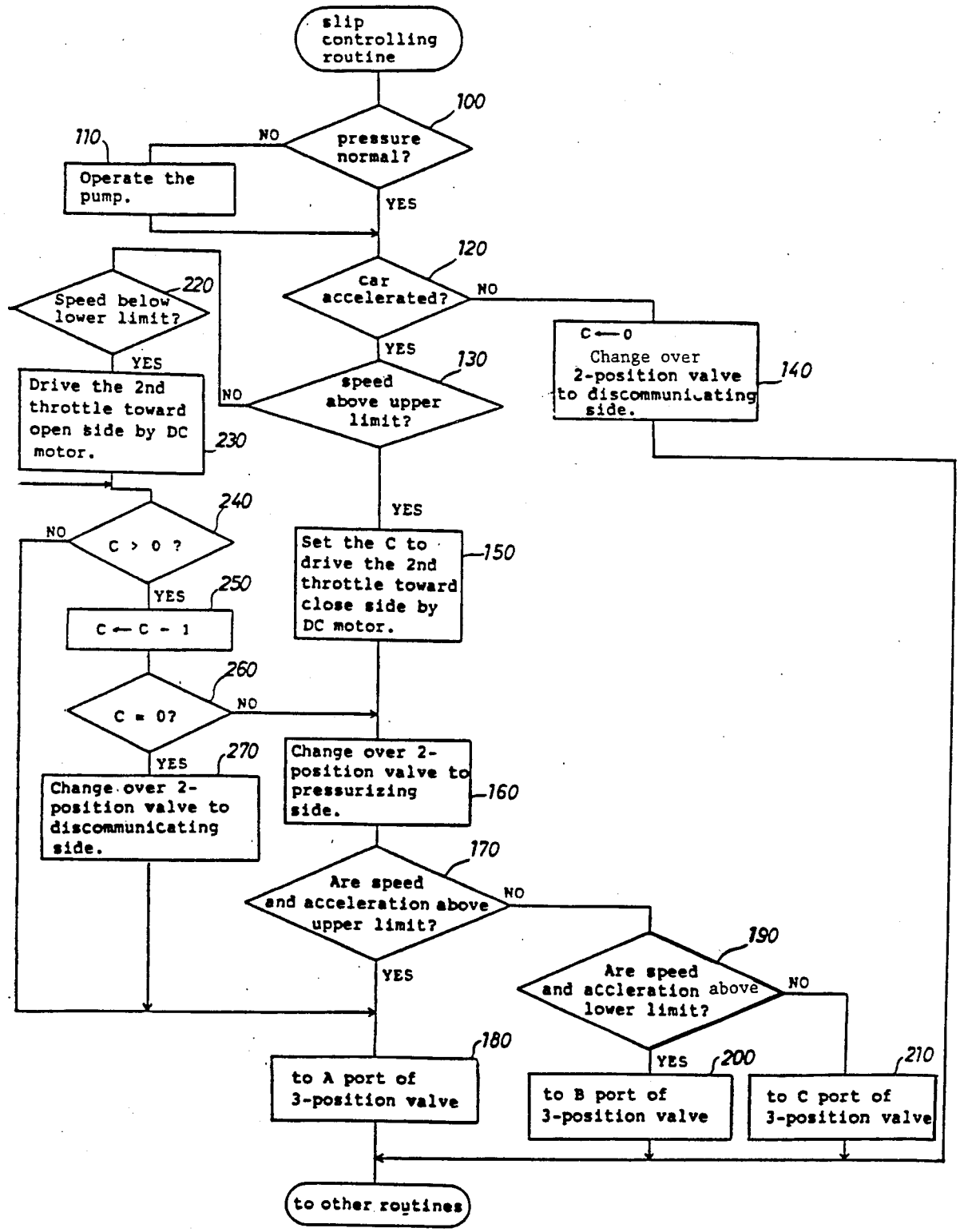
FIG. 3 is a flow chart of a control program for the system of FIG. 2.

The wheel slip controlling system of the present embodiment operates in accordance with a flow chart illustrated in FIG. 3. The flow chart indicates a wheel slip controlling routine which is stored in the ROM 90A-2 and is executed repeatedly every predetermined period of time to control a slip of the wheels.

If the CPU 90A-1 advances into a process of the wheel slip controlling routine, step 100 is first executed to determine if the pressure of the hydraulic system is normal or not. The pressure of the accumulator 22 of the anti-skid brake system is detected by the hydraulic switch 27 as described hereinabove, and if the pressure lowers, the hydraulic switch 27 will provide no output. Thus, the output of the hydraulic switch 27 is monitored, and if there is no output from the hydraulic switch 27, step 110 is once executed to operate the pump 21 to raise the pressure of the accumulator 22 until an output of the hydraulic switch 27 is received. However, if there is an output of the hydraulic switch 27 and thus the pressure is determined to be normal, there is no necessity of executing the process of step 110, and control advances directly to step 120.

At step 120, it is determined if the car is now being accelerated or decelerated. In particular, acceleration is calculated from a frequency of pulse signals from the car speed sensor 60A, and it is determined if a result of the calculation is equal to or greater than zero. If it is determined that the result is equal to or greater than zero, that is, the car is being accelerated, control advances to step 130 to execute traction control. However, it it is determined that the result is less than zero (that the car is being decelerated), step 140 is executed to reset a counter C which is used in the traction control to indicate that the present routine is finished and that another routine for a conventional anti-skid control (not shown) will be executed.

At step 130, as a first determination for executing the traction control, it is determined if the driven wheels are rotating at a higher speed than an upper limit value for the driven wheel rotational speed. The upper limit value is defined as a speed represented by a line Vh illustrated in (A) of FIG. 4 and is a rotational speed at which a maximum frictional force acts on the driven wheels as calculated from the detection result Vc of the car speed sensor 60A. In other words, the limit is an upper limit value within a range of rotational speed of the driven wheels at which the slip ratio becomes —10% or so. Reference symbol Vl in (A) of FIG. 4 indicates a lower limit value of the range. If a step 130 the detection result Vr of the wheel speed sensor 60B is such that $Vr \geq Vh$, then step 150 is executed to set the counter C to a predetermined positive integer to drive the second throttle valve 14 toward the closed side by the DC motor 12. At the following step 160, a changing over operation is executed to change over the two position valve 33 to a pressurizing side wherein the pressure of the accumulator 22 is imparted to the pressure change-over valve 31. By this changing over operation, the output power of the internal combustion engine 1 which drives the driven wheels RL and RR is kept low, and a braking pressure is applied to the cut valve 24 so that a braking force acts upon the driven wheels RR and RL.

Step 170 is next executed to determine if the rotational speed Vr and the acceleration ar of the driven wheel RL exceed their respective upper limit values. The upper and lower limit values of the acceleration are predetermined values ah and al as illustrated in (B) of FIG. 4, and they represent upper and lower limit values that the acceleration can assume while a large frictional force is maintained between the driven wheels and the road surface as estimated from the weight of the car, the load to the driven wheels, and so on. Accordingly, when the condition of step 170 is met, the rotation of the driven wheels involves a large slip, and thus step 180 is executed to carry out a changing over control to the A port of the three position valve 23 such that pressurization from the pressure change-over valve 31 to the cut valve 24 acts as a braking force.

If at step 170 it is determined that the condition is not met, it is determined at step 190 if the actual rotational speed Vr and acceleration ar of the driven wheels are higher than the lower limit values Vl and al for the speed and acceleration, respectively. Thus, if they are determined to be above the lower limits, then the magnitude of a braking force to the driven wheels is regarded as suitable at present, and the three position valve 23 is changed over to the B port to maintain constant volume of the upper chamber which imparts the braking force of the cut valve 24 (step 200). Conversely, if it is determined at step 190 that either one or both of the speed and the acceleration are below the lower limit value or values thereof, it is determined that a braking force greater than the required level has been applied to the driven wheels; therefore, the C port of the three position valve 23 is connected to the hydraulic system to increase the volume of the upper chamber of the cut valve 24 to thereby reduce the braking force to the driven wheels (step 210).

The processes of steps 220 to 270 are executed when it is determined at step 130 that the speed is below the upper limit. They are provided to set a delay time to control the two position valve 33 toward the discommunicating side and to close the second throttle valve. As described hereinabove, when it is determined at step 130 that the speed is above the upper limit, the position of the second throttle valve is closed so as to keep the output power of the internal combustion engine 1 low. The two position valve 33 is driven from a pressure discommunicating side, wherein the pressure of the accumulator 22 is not imparted, to the pressure change-over valve 31, and thus the brake is rendered effectively by the pressure of the accumulator 22. Subsequently, the three position valve 23 is suitably actuated to accomplish traction control to obtain an optimum driving force. Improved control of the braking force corresponding to variations of the rotational speed Vr and the acceleration ar of the driven wheels is thereby effected.

If a negative decision is made at step 130 and the traction control mentioned above is continued, the position of the second throttle valve 14 is closed at steps 220 and 230. Namely, if the rotational speed Vr has already been below the lower limit value Vl or is tested (at step 220) and Vr<Vl, the DC motor 12 is operated in opposite rotation than at step 150 mentioned above so as to open the second throttle valve 14 at step 230. The second throttle valve is opened because it is considered unnecessary to lower the output power of the internal combustion engine 1 down to the existing level. If Vr≧Vl, however, it is not necessary to change the position of the throttle valve 14. In such a case, the steps followed by step throttle valve 14. In such a case, the steps followed by step 240 may be carried out without the execution of step 230.

At steps 240 and 270, switching of the two position valve 33 to the pressure discommunicating side is executed after a predetermined period of time. In other words, when the abovementioned routine is executed again after lapse of the predetermined period of time, if at step 130 it is determined that the rotational speed Vr of the driven wheels is not over the upper limit value Vh, the two position valve 33 is promptly changed over to the pressure discommunicating side, and the braking force applied to the driven wheels so far will disappear completely, thereby causing vibrations to the car. Therefore, while two position valve 33 is held to the pressure communicating side to produce a braking force only for the predetermined period of time after it has been determined that the condition of step 130 is no longer met, the braking force of the driven wheels is controlled by the three position valve 23. Accordingly, if it is determined at step 130 that the condition is not met, then the control of the second throttle valve 14 is completed, and step 240 is executed to determine if the contents of the counter C which was set at step 150 are greater than zero. If C>0, the counter C is decremented at step 250, and if it is determined at step 260 that the new contents of the counter C are not zero, then the aforementioned steps including step 160 are executed again. However, if C=0, it is determined that the two position valve 33 has been held to the pressure communicating side for the predetermined period of time so that control now proceeds to step 270 at which the two position valve 33 is changed over to the pressure discommunicating side. Step 180 is then executed without decrementing the counter C again in accordance with the determination at step 240.

Figure 4:
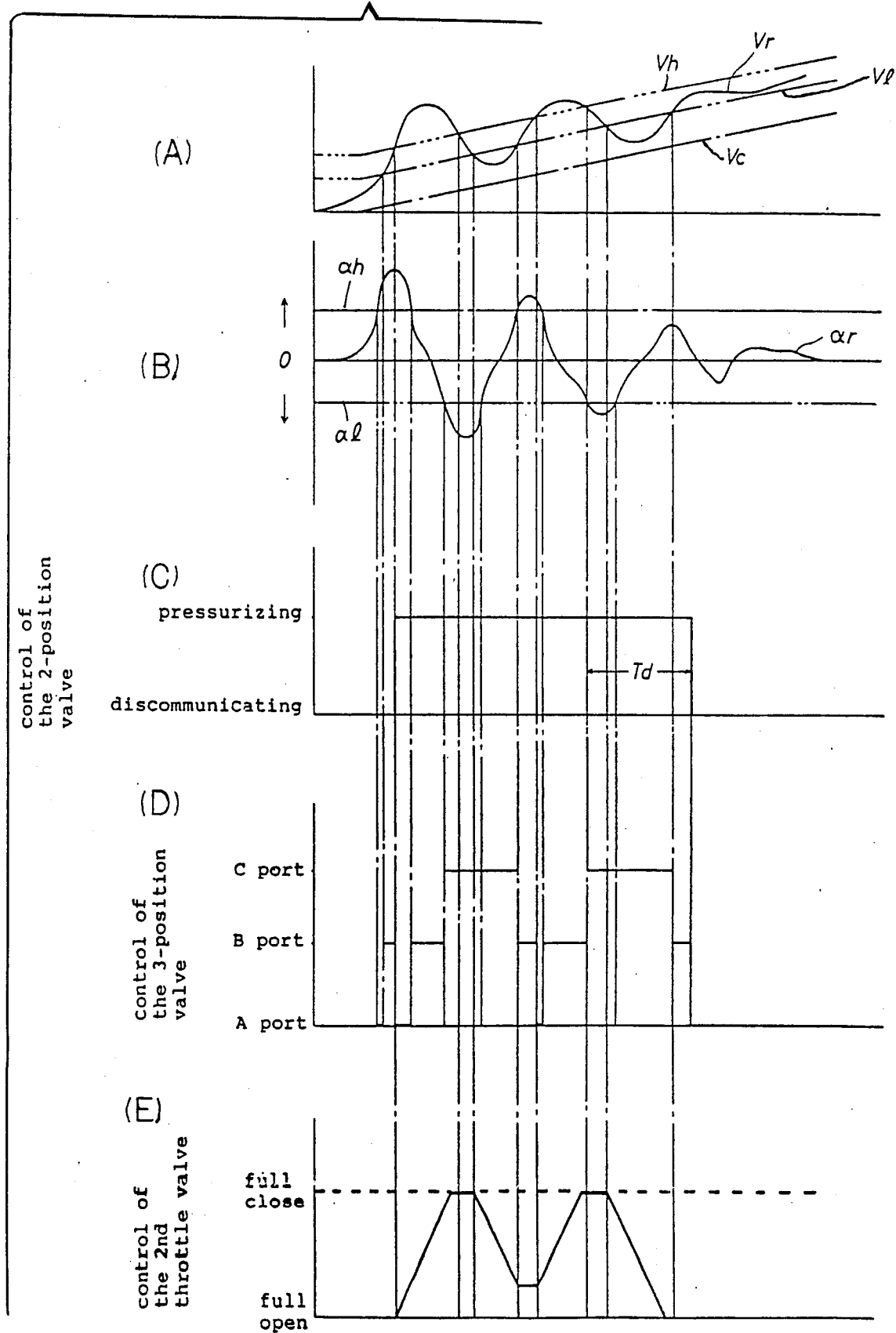
FIG. 4 is a timing chart for control of the system of FIG. 2.

Controls of the two position valve 33, the three position valve 23, and the second throttle valve 14 according to the above processing steps are illustrated in (C), (D) and (E) of FIG. 4. As shown, once the two position valve 33 is rendered operative, it effects transmission of pressure to produce a braking force until the car is brought to a stabilized accelerated condition due to a delay time Td of the two position valve 33. In other words, the braking force is applied for the time preset by the counter while the three position valve 23 suitably changes over the three ports thereof to adjust the braking force to execute the traction control.

As shown in (E) of FIG. 4, the output power of the internal combustion engine 1 is decreased in accordance with the decrease of the intake air amount when the rotational speed of driven wheels becomes too high by controlling the position of the second throttle valve 14. However, the output power is increased in accordance with the increase of the intake air amount when the rotational speed becomes too low because of the braking force of the aforementioned brake mechanism.

In the embodiment mentioned above, the car speed sensor 60A and the wheel speed sensor 60B correspond to the slip detecting means M3, and the output power of these sensors is compared with the upper and lower limits of the rotational speed and acceleration of the driven wheels. The output power also controls the second throttle valve 14 and the hydraulic system 20 of the anti-skid brake system based on the compared results from the traction control means M8.

The present embodiment thus provides an excellent example of the constitution of a wheel slip controlling system which can attain traction control during acceleration of a car as shown in (A) of FIG. 4 by additionally providing a hydraulic controlling system 30 and s second throttle valve 14 for traction control. In other words, if a hydraulic system of an anti-skid brake system which is conventionally installed on a car is utilized, and a constant braking force is provided to the driven wheels by means of the newly provided hydraulic system, the braking force is thereafter regulated by the same control as in the anti-skid brake system. Besides, even if the same electronic controlling device 90 with the anti-skid brake system is used, a slip controlling routine as illustrated in FIG. 3 is executed during acceleration of the car, whereas another slip controlling routine for known anti-skid braking (not shown) is executed during deceleration. The same electronic controlling device is used commonly, and thus a control system having good operability can be constructed. Moreover, since the hydraulic control of the anti-skid brake system is designed to allow finer pressure control than a conventional one, fine traction control can be attained readily.

It is possible to reduce the hydraulic system in size and weight since the output power of the internal combustion engine 1 is also controlled by the second throttle valve 14 during braking; therefore, the necessary braking force for traction control is minimized. In addition, the fuel consumption is improved and less heat is generated during braking because no extra fuel is supplied to the internal combustion engine 1 when the braking force is generated. As a whole, traction control with improved efficiency can be achieved by employing the hydraulic pressure for a quick response and the second throttle valve 14 for controlling the rotation for a comparatively longer period.

It is to be noted that while in the present embodiment control of the braking force is all accomplished by the common three position valve 23 of the anti-skid brake system described above, the two position valve 33 may be replaced by a three position valve which is controlled to regulate the tracking hydraulic pressure which is provided to the pressure change-over valve 31. Control of the three position valve in the latter case may be achieved by execution of substantially the same routine as that of FIG. 3. When the rotational speed and acceleration of the driven wheels exceed the respective upper limit values, the pressure of the accumulator 22 may be imparted to the pressure change-over valve 31, but when they are lower than the respective lower limit values therefor, the pressure of the accumulator 22 may be reduced. In any other conditions, the braking force may be maintained constant.

Now, a second embodiment will be described wherein the electronic controlling device 90 is constructed from electronic circuits without using a microcomputer. The second embodiment has a circuitry construction as illustrated in FIG. 5.

Figure 5:
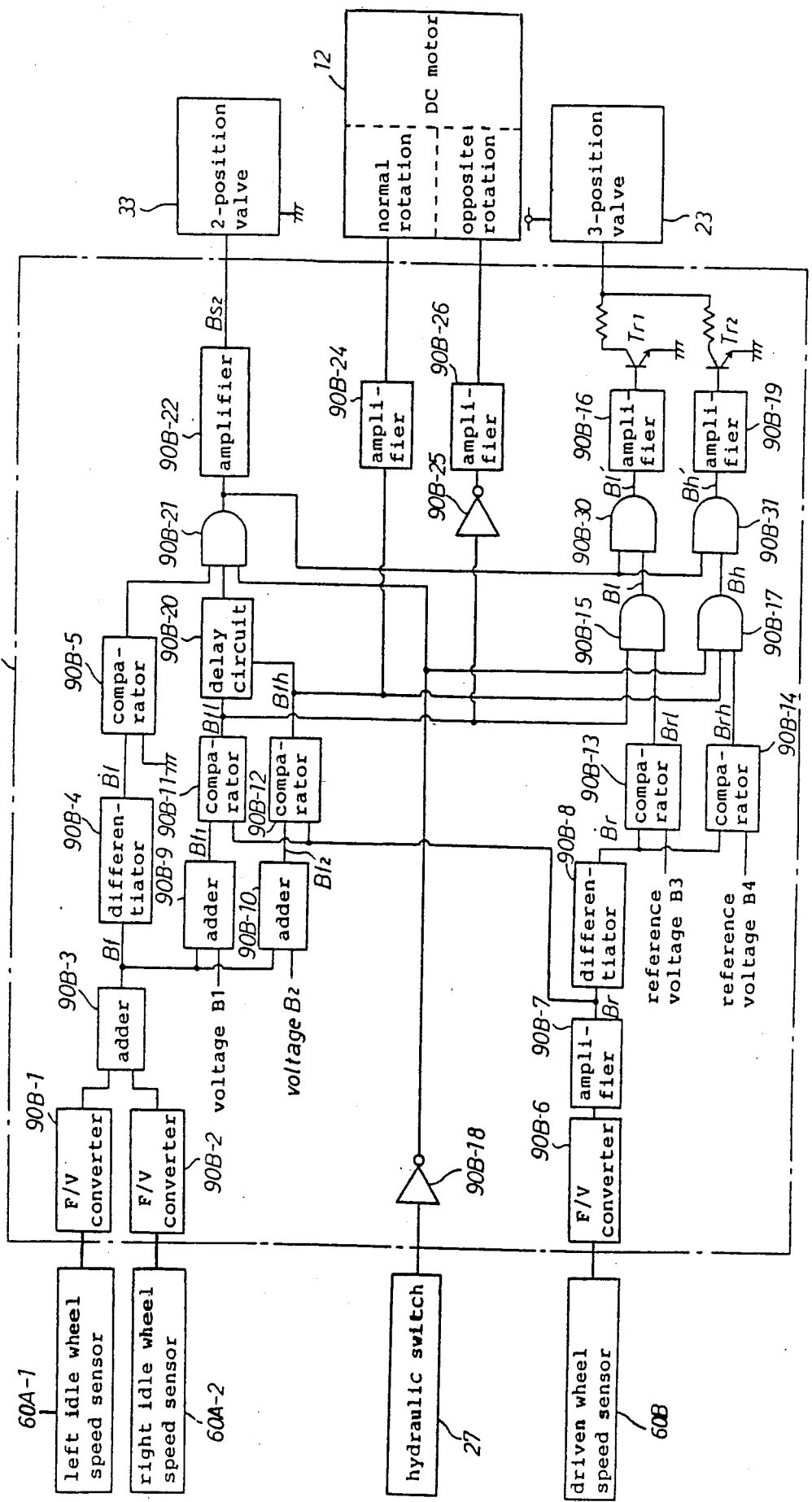
FIG. 5 is a block diagram illustrating the circuits of the electronic controlling section of the first embodiment when the microcomputer is not used.

Referring to FIG. 5, reference symbols 90B-1 and 90B-2 denote F/V converters for converting a frequency of pulse signals developed from left and right idle wheel speed sensors 60A-1 and 60A-2, corresponding to rotations of idle wheels, into a voltage signal. Reference symbol 90B-3 designates an adder for adding the thus converted voltage signal to obtain a voltage Bf corresponding to the travelling speed of the car (hereinafter referred to as a car speed voltage). Reference 90B-4 designates a differentiator for differentiating the car speed voltage Bf to obtain a voltage Bf corresponding to an acceleration of the car (hereinafter referred to as a car acceleration voltage), and reference 90B-5 designates a comparator for comparing the car acceleration voltage Bf with the ground voltage (0 volt) to determine if the car is being accelerated or not. Further, reference symbol 90B-6 denotes an F/V converter for converting a frequency of pulse signals developed from the wheel speed sensor 60B into a voltage signal, and 90B-7 designates an amplifier for amplifying the voltage signal from the F/V converter 90B-6 to a voltage corresponding to the car speed voltage Bf obtained from the adder 90B-3 to obtain a driven wheel speed voltage Br indicative of the speed Vr of the driven wheels. Reference 90B-8 designates a differentiator for differentiating the driven wheel speed voltage Br to output a driven wheel acceleration voltage Br.

In addition, reference symbols 90B-9 and 90B-10 denote adders for adding predetermined voltages B1 and B2 to the car speed voltage Bf developed from the adder 90B-3 and corresponding to the travelling speed of the car to get output reference voltages Bf1 and Bf2 for determination of a degree of an acceleration slip of the car. Reference symbols 90B-11 and 90B-12 denote comparators for comparing the reference voltages Bf1 and Bf2 outputted from the adders 90B-9 and 90B-10 to the driven wheel speed voltage Br outputted from the amplifier 90B-7. The comparator output voltage signals Bfl and Bfh are of a high level when $Bf1 \leq Br$ and $Bf2 \leq Br$, respectively. In addition, reference symbols 90B-13 and 90B-14 also denote comparators for comparing the driven wheel acceleration voltage Br outputted from the differentiator 90B-8 with predetermined voltages B3 and B4 to output voltage signals Brl and Brh of a high lever $Br \geq B3$ and $Br \geq B4$, respectively.

The voltage signals Bfl and Brl outputted from the comparators 90B-11 and 90B-13 are inputted to an AND circuit 90B-15. A voltage signal Bl outputted from the AND circuit 90B-15 is inputted to another AND circuit 90B-30 at the next stage, and a signal Bl' outputted from the AND circuit 90B-30 is provided via an amplifier 90B-16 to the base of a transistor Tr1 as a controlling signal for changing over the three position valve 23 to the A port or to the C port. The voltage signals Bfh and Brh outputted from the comparators 90B-12 and 90B-14, respectively, are inputted to a further AND circuit 90B-17, and a signal from the hydraulic switch 27 is also inputted to the AND circuit 90B-17 via a NOT circuit 90B-18. A voltage signal Bh outputted from the AND circuit 90B-17 is inputted to a further AND circuit 90B-31 from which a voltage signal Bh' is outputted. The voltage signal Bh' is applied via an amplifier 90B-19 to the base of another transistor Tr2 as a controlling signal for changing over the three position valve 23 to the B port. Further, an output of an AND circuit 90B-21 is inputted via the AND circuits 90B-30 and 90B-31 to the amplifiers 90B-19 and 90B-16, respectively. Accordingly, the three position valve 23 is normally controlled to the A port.

A voltage signal which is outputted from the comparator 90B-5 indicating that the car is in an outputted accelerating condition, a voltage signal outputted from the comparator 90B-12 via a delay circuit 90B-20, and a further voltage signal outputted from the hydraulic switch 27 via the NOT circuit 90B-18 are inputted to an AND circuit 90B-21. An output terminal of the AND circuit 90B-21 is connected to an amplifier 90B-22 so as to provide an actuating signal via the amplifier 90B-22 to the two position valve 33.

It is apparent that the circuit construction as described above can attain such control of the two position valve 33 and the three position valve 23 as seen in FIG. 4. In particular, the delay circuit 90B-20 corresponds to means for producing a delay of control of the counter C provided by the above-described steps 240 to 270, while a signal amplified by the amplifier 90B-19 corresponds to results of the determination provided at step 180, and a signal amplified by the amplifier 90B-16 corresponds to the process at step 200. Further, the FIG. 5 circuit is constituted so as to operate the DC motor 12 in a normal direction (the second throttle valve is closed) by the amplifier 90B-24 which amplifies the output of the comparator 90B-12, and via a NOT circuit 90B-25 for inverting the output of the comparator 90B-11 and an amplifier 90B-26, the DC motor is operated in the opposite direction. Thus, as shown in (E) of FIG. 4, when the rotational speed of the driven wheels has exceeded the upper limit, the position of the second throttle valve is closed, but it is opened when the speed has fallen below the lower limit. In this manner, the components of the embodiments described above may be suitably chosen without departing from the scope of the present invention.

What is claimed is:

1. A wheel slip controlling system, comprising:
   braking means operable by a driver of a car for applying a braking pressure to driven wheels of said car;
   slip detecting means for detecting a slipping condition of said driven wheels and outputting a slip signal indicative of said slipping condition;
   anti-skid control means responsive to said slip signal for controlling said braking pressure applied by said braking means;
   acceleration means operable by said driver of said car for controlling a rate of rotation of said driven wheels;
   a first throttle valve placed in an air intake path of an internal combustion engine of said car, said first throttle valve being controlled by said acceleration means;
   a second throttle valve placed in said air intake path of said internal combustion engine; and
   traction control means responsive to said slip signal outputted from said slip detecting means when said acceleration means is actuated, said traction control means controlling the rate of rotation of said driven wheels by varying said braking pressure and controlling said second throttle valve to control air intake of said engine such that said slipping condition of said driven wheels is substantially reduced.

2. A wheel slip controlling system according to claim 1, wherein said braking means includes:
   a brake pedal actuated by said driver of said car; and
   a master cylinder for applying said braking pressure responsive to the actuation of said brake pedal, said master cylinder being connected to said anti-skid control means.

3. A wheel slip controlling system according to claim 1, wherein said slip detecting means includes:
   a first sensor for detecting the speed of said driven wheels; and
   a second sensor for detecting the speed of said car.

4. A wheel slip controlling system according to claim 1, wherein said anti-skid control means includes:
   a hydraulic braking pressure source for storing, pumping, and accumulating pressurized brake fluid;
   a first electromagnetically actuable valve being connected to said hydraulic braking pressure source, said first electromagnetically actuable valve having three output ports designated as A, B and C, respectively, wherein said first electromagnetically actuable valve provides brake fluid at an increased hydraulic pressure at said A port, provides brake fluid at a substantially unchanged hydraulic pressure at said B port, and provides brake fluid at a reduced hydraulic pressure at said C port;
   a valve responsive to one of said first electromagnetically actuable valve output ports for regulating the hydraulic pressure from said hydraulic braking pressure source and said braking means;
   a second electromagnetically actuable valve responsive to said traction control means and connected to said hydraulic braking pressure source;
   a cylinder connected to said hydraulic braking pressure source via said second electromagnetically actuable valve; and
   a pressure actuated valve responsive to the hydraulic pressure from said cylinder at a first input port and the hydraulic pressure from said master cylinder at a second input port, said pressure actuated valve outputting the hydraulic pressure of the greater of said hydraulic pressures at said first and second input ports.

5. A wheel slip controlling system according to claim 4, wherein said traction control means includes:
   means for applying a control signal to said second electromagnetically actuable valve so as to connect said hydraulic braking pressure source to said cylinder when the driven wheel speed exceeds a predetermined value, said control signal applying means including means for delaying the application of said control signal for a predetermined period of time such that the driven wheel speed becomes lower than said predetermined value, said predetermined period of time being set by means of a preset counter.

6. A wheel slip controlling system according to claim 4, wherein said traction control means includes:
   means for selecting said A port of said first electromagnetically actuable valve when the speed of said driven wheel and an acceleration of said driven wheel obtained by differentiating the driven wheel speed exceed a first upper limit value and a second upper limit value, respectively; said means for selecting further selecting said B port of said first electromagnetically actuable valve when the speed of said driven wheel and said acceleration of said driven wheel exceed a first lower limit value and a second lower limit value, respectively, but are less than said respective first and second upper limit values; said means for selecting further selecting said C port of said first electromagnetically actuable valve when the speed of said driven wheel is less than said first lower limit value or the acceleration of said driven wheel is less than said second lower limit value.

7. A wheel slip controlling system according to claim 6, wherein said traction control means includes:

means for adjusting the position of the second throttle valve from a fully opened to a fully closed state when the driven wheel speed has exceeded said first upper limit value, said means for adjusting also adjusting the position of the second throttle valve from the fully closed to the fully opened state when the driven wheel speed has fallen below said first lower limit value, said means for adjusting holding the second throttle valve in place when said second throttle valve is fully closed or fully opened.

8. A wheel slip controlling system according to claim 7, wherein said adjusting means is a direct current motor.

* * * * *